(12) United States Patent
Hynes et al.

(10) Patent No.: US 6,883,504 B1
(45) Date of Patent: Apr. 26, 2005

(54) EXHAUST GAS RECIRCULATION METHOD FOR DECREASING START-UP FUEL REQUIREMENT

(75) Inventors: William J Hynes, Fenton, MO (US); Robert T Forgiel, Tecumseh, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/766,222

(22) Filed: Jan. 28, 2004

(51) Int. Cl.[7] .............................................. F02M 25/07
(52) U.S. Cl. ........................... 123/568.21; 123/179.16; 701/108
(58) Field of Search .................. 123/568.11, 568.2, 123/568.29, 179.16; 701/108

(56) References Cited

U.S. PATENT DOCUMENTS

| | | | | |
|---|---|---|---|---|
| 4,367,720 A | * | 1/1983 | Miyoshi et al. | 123/568.27 |
| 4,387,694 A | * | 6/1983 | Yoshiba et al. | 123/378 |
| 6,659,069 B2 | * | 12/2003 | Shiraishi et al. | 123/298 |
| 6,659,090 B2 | * | 12/2003 | Sisken | 123/568.11 |

FOREIGN PATENT DOCUMENTS

JP          08061157 A  *  3/1996  .......... F02M/25/07

* cited by examiner

*Primary Examiner*—Noah P. Kamen
*Assistant Examiner*—Arnold Castro
(74) *Attorney, Agent, or Firm*—Ralph E. Smith

(57) ABSTRACT

An exhaust gas recirculation (EGR) control system for an engine comprises a valve, such as an EGR valve, that controls recirculation of exhaust gas in the engine between an exhaust manifold and an intake manifold. A controller communicates with the valve and opens the valve after the engine is turned off to allow the exhaust gas into the intake manifold. The exhaust gas is therefore present in the intake manifold when the engine is next started. In this manner, the amount of fuel required to start the engine is reduced, and startup emissions are reduced.

10 Claims, 2 Drawing Sheets

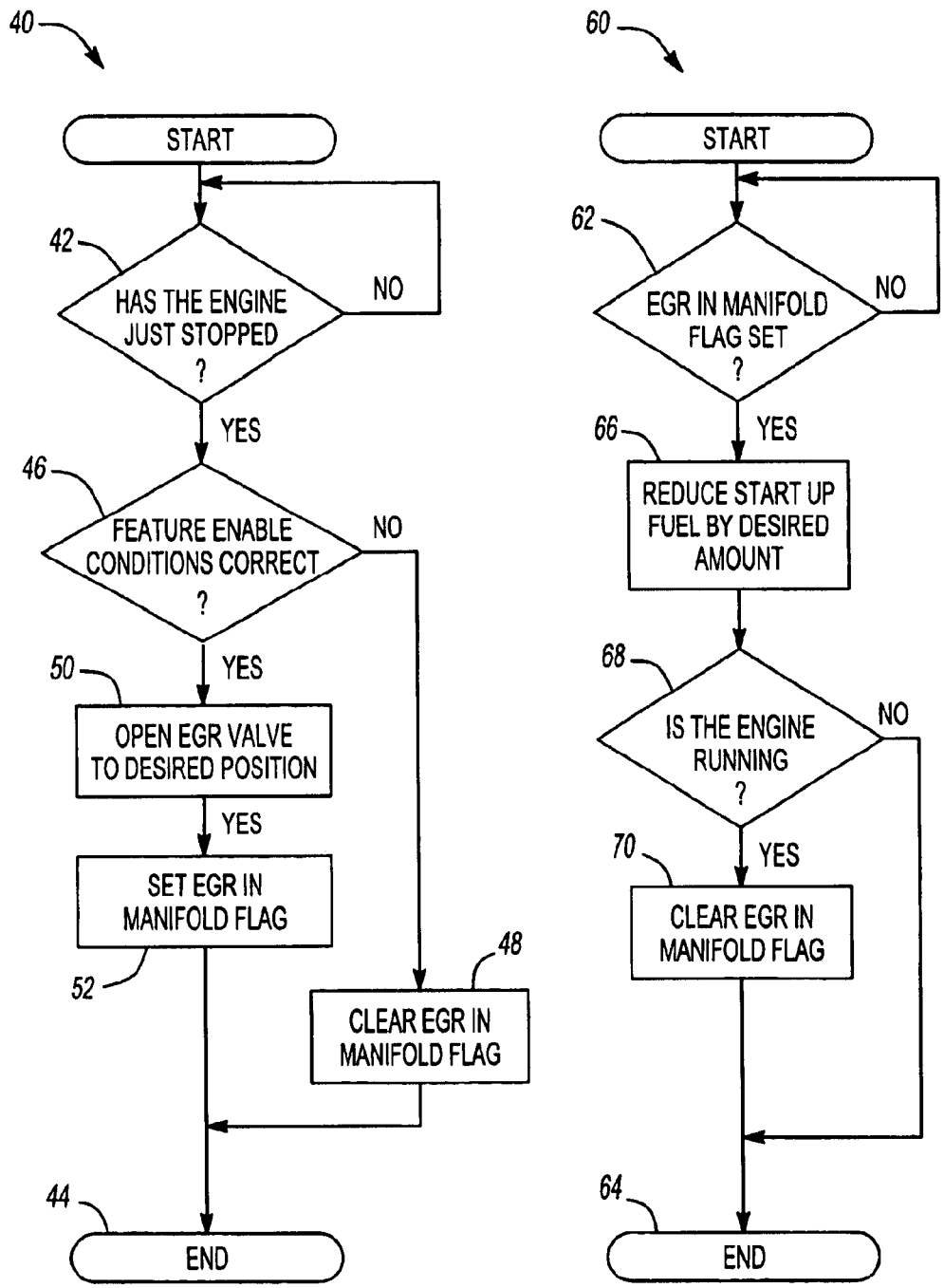

EXHAUST GAS RECIRCULATION METHOD FOR DECREASING START-UP FUEL REQUIREMENT

FIELD OF THE INVENTION

The present invention relates to exhaust gas recirculation, and more particularly to using exhaust gas recirculation to improve engine start up performance.

BACKGROUND OF THE INVENTION

Exhaust gas recirculation (EGR) is used to reduce emissions and increase fuel economy in internal combustion engines. Exhaust gas is forced from the engine cylinders into the exhaust manifold after combustion. The exhaust gas includes non-burnable gas and other emissions that are otherwise released into the environment.

Conventionally, EGR is used while the engine is running to reduce emissions and increase fuel economy. The exhaust gas is recirculated to mix with intake air before entering the engine cylinders. Because the recirculated exhaust gas is non-burnable and displaces a portion of the intake air, a smaller amount of burnable intake air enters the engine. Therefore, a smaller amount of fuel is required to combust with the burnable air.

SUMMARY OF THE INVENTION

An exhaust gas recirculation control system for an engine comprises a valve that controls recirculation of exhaust gas in the engine between an exhaust manifold and an intake manifold. A controller communicates with the valve and opens the valve after the engine is turned off to allow the exhaust gas into the intake manifold.

In a further aspect of the invention, a method for controlling exhaust gas recirculation in an engine at engine startup comprises turning off the engine and opening a valve that allows exhaust gas into an intake manifold after the engine is turned off. An engine start up is initiated. It is determined if there is exhaust gas in the intake manifold. Fuel delivery to the engine is reduced if there is exhaust gas in the intake manifold.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a flow diagram of an engine shutdown algorithm according to the present invention; and FIG. 3 is a flow diagram of an engine startup algorithm according to the present invention.

DETAILED DESCRIPTION OF THE PREFERRED EMBODIMENTS

Figure 1:
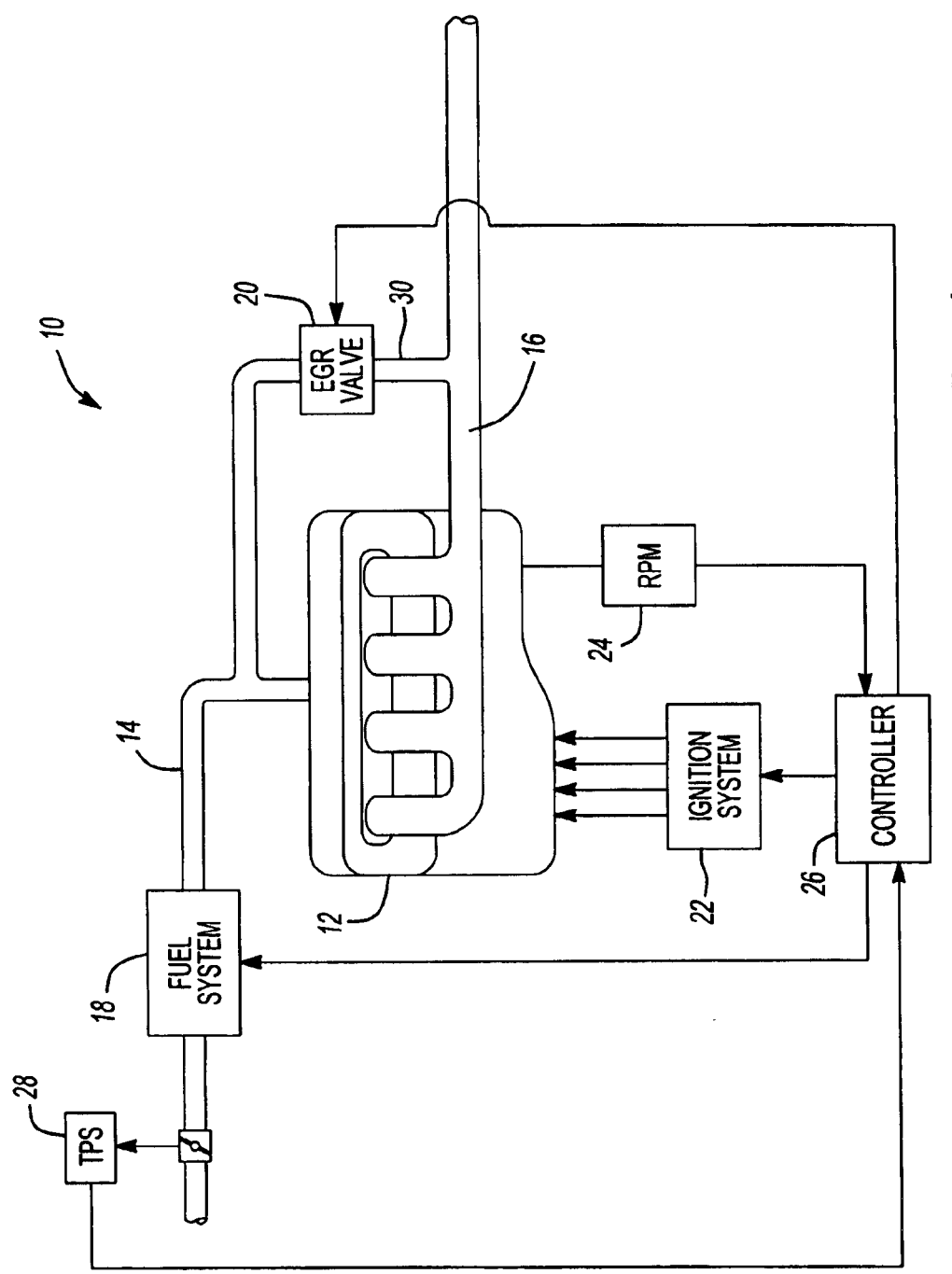
FIG. 1 is a functional block diagram of an engine control system providing exhaust gas recirculation according to the present invention.

The following description of the preferred embodiment(s) is merely exemplary in nature and is in no way intended to limit the invention, its application, or uses.

Referring to FIG. 1, an engine control system 10 includes an engine 12, an intake manifold 14, an exhaust manifold 16, a fuel system 18, an EGR valve 20, an ignition system 22, an engine speed sensor 24, and an engine controller 26. The engine controller 26 monitors and adjusts engine performance based on various input signals. For example, the controller 26 receives an engine speed signal from the engine speed sensor 24. A throttle position sensor (TPS) 28 outputs a throttle position signal to the controller 26. The controller 26 determines air flow into the engine 12 based on the throttle position. The controller determines fuel delivery from a fuel system 18 to the engine 12 based on the throttle position. The controller 26 communicates with the ignition system 22 to determine ignition spark timing.

The controller 26 adjusts the EGR valve 20 to reduce certain emissions. Higher combustion temperatures in the engine 12 increase levels of the emissions in exhaust gas. Recirculating a portion of the exhaust gas back into the engine 12 along with intake air reduces the combustion temperatures. The EGR valve 20 controls the amount of exhaust gas that is recirculated with the intake air. The recirculated exhaust gases lower the combustion temperatures, which reduces emissions. The controller 26 determines the position of the EGR valve 20 based on engine conditions such as engine speed and desired air per cylinder. A conduit 30 connects the exhaust manifold 16 to the intake manifold 14. The EGR valve 20 is positioned along the conduit 30 and meters EGR according to input from the controller 26.

In the preferred embodiment, the controller 26 opens the EGR valve 20 immediately after the engine 12 is turned off. At this instance, there is still a vacuum in the intake manifold 14. A controlled amount of recirculated exhaust gas is drawn into the intake manifold 14. The exhaust gas remains in the intake manifold 14 while the engine 12 is off, and remains until the next time the engine 12 is started. Therefore, with the exhaust gas already in the intake manifold 14, there will be less burnable air in the engine 12 and less fuel will be required to start the engine 12. As a result, start up fuel economy is improved, start up emissions are reduced, and start up engine flare can be better controlled in engines with large intake manifolds. Additionally, some engines are difficult to start at extremely low temperatures because fuel injectors are not able to output sufficient fuel. With the exhaust gas in the intake manifold 14 at engine start up, the injectors do not need to output as much fuel at the extremely low temperatures.

The controller adjusts the position of the EGR valve at engine shutdown according to an engine shutdown algorithm 40 as shown in FIG. 2. At step 42, the engine shutdown algorithm 40 determines if the engine has stopped. If the engine has not stopped, the engine shutdown algorithm 40 repeats step 42. In other words, the engine shutdown algorithm 40 continuously checks if the engine has stopped at step 42. If the engine has stopped, the engine shutdown algorithm 40 may determine if various engine conditions are present that enable the EGR valve to be opened according to the present invention at step 46. For example, the EGR system and the emissions system may be required to be functioning properly for the EGR valve to be opened. If the engine conditions are not present, an EGR flag is cleared at step 48 and the algorithm 40 is subsequently terminated at step 44. In another embodiment, step 46 may be omitted. The EGR flag indicates to the controller whether there is EGR in the intake manifold.

If the engine conditions are present at step 46, the controller opens the EGR valve to a desired position at step 50. In one embodiment, the desired position is a fixed position that is determined according to an amount of EGR that a particular engine is able to operate with. In another embodiment, the controller may consider ambient temperature when determining the desired position. The EGR flag is set at step 52. Therefore, at the next engine startup, the controller is able to determine that EGR is present in the intake manifold and adjust fuel delivery accordingly.

The controller compensates for EGR in the intake manifold at the next engine startup according to an engine start algorithm 60 as shown in FIG. 3. The engine start algorithm 60 determines if the EGR flag is set at step 62. If the EGR flag is not set, the engine start algorithm 60 terminates at step 64 and the controller continues with a standard engine start up. If the EGR flag is set, the fuel delivered to the engine at start up is reduced by a desired percentage at step 66. The percentage is determined based on the amount of EGR in the intake manifold. The engine start algorithm 60 determines if the engine is running at step 68. If the engine is not running, the engine start algorithm 60 repeats step 62. If the engine is running, the engine start algorithm 60 clears the EGR flag at step 70.

The description of the invention is merely exemplary in nature and, thus, variation that do not depart from the gist of the invention are intended to be within the scope of the invention. Such variations are not to be regarded as a departure from the spirit and scope of the invention.

What is claimed is:

1. An exhaust gas recirculation control system for an engine comprising:
    a valve that controls recirculation of exhaust gas in the engine between an exhaust manifold and an intake manifold; and
    a controller that communicates with the valve and opens the valve after the engine is turned off to allow the exhaust gas into the intake manifold.

2. The exhaust gas recirculation control system of claim 1 wherein the controller determines if there is exhaust gas in the intake manifold.

3. The exhaust gas recirculation control system of claim 2 wherein the controller reduces fuel delivery to the engine at a subsequent engine startup if there is exhaust gas in the intake manifold.

4. The exhaust gas recirculation control system of claim 3 wherein the controller sets a flag that indicates that the exhaust gas is in the intake manifold, and wherein the controller reduces the fuel delivery if the flag is set.

5. The exhaust gas recirculation control system of claim 1 wherein the controller opens the valve to a desired position that is determined according to at least one of ambient temperature and an engine type.

6. The exhaust gas recirculation control system of claim 5 wherein the engine type is indicative of the amount of exhaust gas the engine is operable to receive at engine startup.

7. An exhaust gas recirculation control system for an engine comprising:
    a valve that controls recirculation of exhaust gas in the engine between an exhaust manifold and an intake manifold; and
    a controller that communicates with the valve and:
        opens the valve after the engine is turned off to allow the exhaust gas into the intake manifold;
        sets a flag that indicates that the exhaust gas is in the intake manifold; and
        reduces fuel delivery to the engine at a subsequent engine startup if the flag is set.

8. The exhaust gas recirculation control system of claim 7 wherein the controller opens the valve to a desired position that is determined according to at least one of ambient temperature and an engine type.

9. The exhaust gas recirculation control system of claim 8 wherein the engine type is indicative of the amount of exhaust gas the engine is operable to receive at engine startup.

10. A method for controlling exhaust gas recirculation in an engine at engine startup comprising:
    turning off the engine;
    opening a valve that allows exhaust gas into an intake manifold after the engine is turned off;
    initiating an engine startup;
    determining if there is exhaust gas in the intake manifold; and
    reducing fuel delivery to the engine at the engine startup if there is exhaust gas in the intake manifold.

* * * * *